US005576258A

United States Patent [19]
Chamberlain et al.

[11] Patent Number: 5,576,258
[45] Date of Patent: Nov. 19, 1996

[54] MODIFIED Y-ZEOLITE, PROCESS FOR THE PREPARATION THEREOF, AND MODIFIED Y-ZEOLITE-CONTAINING FCC CATALYST

[75] Inventors: Oscar R. Chamberlain; Eduardo F. Souza-Aguiar, both of Rio de Janeiro, Brazil; Avelino C. Canos, Valencia, Spain

[73] Assignee: Petroleo Brasileiro S.A. Petrobras, Rio De Janeiro, Brazil

[21] Appl. No.: 385,251

[22] Filed: Feb. 8, 1995

[30] Foreign Application Priority Data

Feb. 9, 1994 [BR] Brazil .................................... 9400475

[51] Int. Cl.[6] ...................................................... B01J 21/00
[52] U.S. Cl. .............................. 502/73; 502/79; 502/208
[58] Field of Search ................................. 502/73, 79, 85, 502/214, 208

[56] References Cited

U.S. PATENT DOCUMENTS

| | | | |
|---|---|---|---|
| 3,252,757 | 5/1966 | Granquist | 23/111 |
| 3,252,889 | 5/1966 | Capell et al. | 208/120 |
| 3,293,192 | 12/1966 | Maher et al. | 252/430 |
| 3,455,842 | 7/1969 | Cornelius et al. | 252/455 |
| 3,506,400 | 4/1970 | Eberly et al. | 23/182 |
| 3,591,488 | 7/1971 | Eberly et al. | 208/111 |
| 3,609,103 | 9/1971 | Gladrow et al. | 252/455 Z |
| 3,676,330 | 7/1972 | Plank et al. | 208/111 |
| 3,743,594 | 7/1973 | Mulaskey | 208/216 |
| 4,218,307 | 8/1980 | McDaniel | 208/120 |
| 4,224,188 | 9/1980 | Alafandi et al. | 252/455 Z |
| 4,357,265 | 11/1982 | Chiang | 502/64 |
| 4,839,319 | 6/1989 | Schuette et al. | 502/64 |
| 4,970,183 | 11/1990 | Nakamoto et al. | 502/68 |
| 5,059,567 | 10/1991 | Linsten et al. | 502/64 |
| 5,378,670 | 1/1995 | Kumar | 502/60 |

FOREIGN PATENT DOCUMENTS 0252761  1/1988  European Pat. Off. .......... B01J 29/08

OTHER PUBLICATIONS

Zeolites, vol. 6, 1986 –"Determination of Framework Aluminum Content In Dealuminated Y–Type Zeolites: A Comparison Based On Unit Cell Size And Wavenumber Ofir Bands"–Jong R. Sohn et al., pp. 225–227 (May).

American Society For Testing And Materials–D–3942–91, "Standard Test Method for Determination of the Unit Cell Dimension of a Faujasite–Type Zeolite"(no date).

American Society For Testing And Materials–D 1160–93a, "Standard Test Method for Distillation of Petroleum Products at Reduced Pressure[1]"(no date).

The Journal of Physical Chemistry, vol. 71. No. 12, Nov. 1967, George T. Kerr, pp. 4155–4156.

Journal of Collois and Interface Science, vol. 21, 1966, "The t–Curve of Multimolecular $N_2$–Adsorption", J. H. deBoer et al, pp. 405–414 (no month).

Applied Catalysis, vol. 66, 1990, "Gas Oil Cracking at the Zeolite–Matrix Interface", A. Corma et al., pp. 247–255 (no month).

Primary Examiner—Gary P. Straub
Assistant Examiner—Thomas G. Dunn, Jr.
Attorney, Agent, or Firm—Joseph M. Noto; Louis A. Morris

[57] ABSTRACT

A process for preparing a modified Y-zeolite, in which a NaY-zeolite is first subjected to an ammonium exchange, the resulting ammonium-exchanged zeolite is subjected to an aluminum exchange, the aluminum-exchanged zeolite is subjected to a steam calcination, and a phosphorus component is incorporated into the steam calcined zeolite, is disclosed. The modified Y-zeolite obtained by this process and an FCC catalyst containing the modified Y-zeolite are also disclosed. The FCC catalyst containing the aluminum-exchanged phosphorus-containing Y-zeolite prepared according to the present invention shows less coke make, and an improved selectivity to $C_3$ olefins compared to FCC catalysts containing zeolites which have either been aluminum exchanged or contain phosphorus.

6 Claims, No Drawings

MODIFIED Y-ZEOLITE, PROCESS FOR THE PREPARATION THEREOF, AND MODIFIED Y-ZEOLITE-CONTAINING FCC CATALYST

CROSS REFERENCE TO RELATED APPLICATIONS

This application claims the benefit of the filing date of prior Brazilian Patent Application Number 9400475-7, filed Feb. 9, 1994, entitled "Process For Preparing A Modified Y-Zeolite", which is incorporated herein by reference in its entirety.

BACKGROUND OF THE INVENTION

1. Field of the Invention

The present invention relates to a modified Y-zeolite, a process for preparing the modified Y-zeolite, and to an FCC catalyst containing the modified Y-zeolite.

2. Description of the Related Art

Hydrocarbon feeds can be catalytically converted to lower boiling products by contacting them with fluidised catalyst particles under appropriate conditions in a reaction zone. The catalyst used in this process is a so-called fluidised catalytic cracking (FCC) catalyst which comprises zeolite particles in a matrix. The zeolites which have been used in the preparation of FCC catalysts include synthetic faujasites or Y-zeolites and modifications thereof, such as ultrastable Y-zeolites (USY) and calcined rare-earth-exchanged Y-zeolites (CREY). In the cracking process, the catalyst particles are deactivated by the precipitation of coke, which is formed as a by-product of the cracking process, on the catalyst particles. The (partially) deactivated catalyst particles are removed from the reaction zone, freed of volatile components in a stripping zone, subsequently passed to a regeneration zone, and, following their regeneration by combustion of the coke with an oxygen-containing gas, fed back to the reaction zone.

In recent times, much attention has been paid to optimizing the properties of the Y-zeolites to be used in FCC catalysts, in order to obtain FCC catalysts which produce less coke and gas and are more selective to gasoline and other desirable products. One of the modifications which has been proposed is the incorporation of phosphorus into the catalyst composition. European patent application No. 0 252 761 describes a cracking catalyst comprising an ultrastable Y-zeolite which has been treated with a phosphorus-containing compound to decrease the coke and gas make of the catalyst.

U.S. Pat. No. 4,970,183 describes a cracking catalyst comprising a phosphorus-containing Y-zeolite which has been prepared by contacting the Y-zeolite with a phosphorus-containing compound and subsequently heating the Y-zeolite at a temperature of 400°–800° C. in a steam atmosphere. Again, this measure has been taken to decrease the coke and gas make of the catalyst.

Another measure which has been taken to improve the properties of the catalyst is the effecting of an aluminum exchange.

U.S. Pat. No. 4,357,265 describes a process for modifying Y-zeolites in which an NaY-zeolite is subjected to an ammonium exchange, a calcination step, and an aluminum exchange. The FCC catalyst comprising the modified Y-zeolite produces gasoline with an improved octane number compared to a catalyst comprising a Y-zeolite which has not been subjected to an aluminum exchange.

U.S. Pat. No. 3,455,842 describes a cracking catalyst comprising a Y-zeolite which has been subjected to an aluminum-exchange step followed by a steam calcination step. This catalyst has an improved selectivity to gasoline compared to catalysts which do not comprise aluminum-exchanged Y-zeolite.

U.S. Pat. No. 4,224,188 describes a cracking catalyst comprising a Y-zeolite which has been prepared from an NaY-zeolite by a combination of ammonium-exchange and aluminum-exchange, which steps may be carried out in various order. The activity of the FCC catalysts comprising the various zeolites is compared.

However, even though the above-mentioned patents describe FCC catalysts with improved properties compared to catalysts comprising unmodified Y-zeolite, there is still need for FCC catalysts which have an improved selectivity to gasoline and LCO, and a lower coke and gas make. An additional problem which is encountered in the use of the zeolites described in the above-mentioned references is that both the aluminum-exchange step and the phosphorus-treatment tend to lower the $=C_3/C_3$ ratio. Since $C_3$ olefins are valuable products, there is need for an FCC catalyst which will show improved gasoline and LCO selectivity, decreased coke make, with the selectivity to $C_3$ olefins being maintained or even improved.

SUMMARY OF THE INVENTION

In accordance with one aspect of the present invention, there is provided a process for preparing a modified Y-zeolite which includes:

a) exchanging a NaY zeolite with a solution of an ammonium salt in a manner so as to lower the amount of $Na_2O$ in the zeolite to a value below 7 wt. %;

b) contacting the product obtained in step a) with an aqueous acidic aluminum-containing solution with a pH between 2 and 4, until the zeolite contains from 0.5 to 6 wt. % of exchanged aluminum, calculated as $Al_2O_3$;

c) isolating and washing the product of step b), and calcining the resulting product in a steam atmosphere at a temperature of from 450° to 800° C. for a period of from 15 minutes to 4 hours; and d) treating the calcined zeolite obtained in step c) with a phosphorus-containing compound, to incorporate from 0.1 to 4 wt. % of phosphorus, calculated as $P_2O_5$, into the zeolite.

In accordance with another aspect of the present invention, there is provided a phosphorus-containing Y-zeolite prepared by the aforementioned process which contains from 0.5 to 6 wt. % of exchanged aluminum, calculated as $Al_2O_3$, and from 0.1 to 4 wt. % of phosphorus, calculated as $P_2O_5$.

In accordance with a further aspect of the present invention, there is provided an FCC catalyst containing the aforementioned phosphorus-containing Y-zeolite.

These and other aspects of the present invention will become apparent upon a review of the following detailed description and the claims appended thereto.

DETAILED DESCRIPTION OF PREFERRED EMBODIMENTS

The present invention provides an improved FCC catalyst which can be obtained by incorporating therein a modified Y-zeolite prepared by a process including the steps of:

a) exchanging an NaY zeolite with a solution of an ammonium salt in order to lower the amount of $Na_2O$ in the zeolite to a value below 7 wt. %, b) contacting the product obtained in step a) with an aqueous acidic aluminum-containing solution with a pH between 2 and 4, until the zeolite contains from 0.5 to 6 wt. % of exchanged aluminum, calculated as $Al_2O_3$;

c) isolating and washing the product of step b), and calcining the resulting product in a steam atmosphere at a temperature of from 450° to 800° C. for a period of 15 minutes to 4 hours;

d) treating the calcined zeolite obtained in step c) with a phosphorus-containing compound, to incorporate from 0.1 to 4 wt. % of phosphorus, calculated as $P_2O_5$, into the zeolite.

In the first step (a), a commercially available NaY-zeolite, the silica/alumina molar ratio of which preferably is between 4 and 6, is subjected to an ammonium-exchange until the amount of sodium, calculated as $Na_2O$, is below 7 wt. %, generally between 0.5 and 7 wt. %. Preferably, ammonium-exchange is carried out until the amount of $Na_2O$ is below 5 wt. %. The final amount of $Na_2O$ present in the zeolite is preferably below 1 wt. %, more preferably below 0.5 wt. %. However, it is not necessary to lower the amount of $Na_2O$ in the zeolite to this value in this process step. Generally it is sufficient to lower the $Na_2O$ content to a value between 2.5 and 5 wt. % in this process step. A further lowering of the $Na_2O$ content can take place after the modification of the Y-zeolite has been completed, or even after the modified Y-zeolite according to the present invention has been incorporated into an FCC catalyst. The ammonium-exchange can, e.g., be carried out using an ammonium sulphate solution, but other procedures known in the art may also be used. In the second step (b), the ammonium-exchanged Y-zeolite obtained in step (a) is subjected to an aluminum-exchange step until the zeolite contains 0.5 to 6 wt. % of exchanged aluminum, calculated as $Al_2O_3$. The percentage of exchanged aluminum present in the zeolite is defined as the difference between the percentage of aluminum, calculated as $Al_2O_3$, in the zeolite after the aluminum-exchange, as determined by way of X-ray fluorescence, and the percentage of aluminum, calculated as $Al_2O_3$, in the zeolite before the aluminum-exchange, as determined by way of X-ray fluorescence. The aluminum-exchange is effected by contacting the ammonium-exchanged zeolite obtained in step (a) with an acidic aqueous solution containing aluminum ions. For example, a solution of a water soluble salt, such as aluminum chloride, aluminum nitrate, or aluminum sulphate may be used. The solution should have a pH value between 2 and 4. If a solution with a pH below 2 is used, the crystallinity of the zeolite will be detrimentally affected to an unacceptable extent. If a solution with a pH above 4 is used, substantial amounts of alumina will precipitate in the solution, which will affect the exchange of aluminum ions. Then, in step (c) the product of step (b) is washed in a conventional manner with water to remove excess ions. The resulting product is calcined in a steam atmosphere at a temperature of from 450° to 800° C. for a period of 15 minutes to 4 hours. It is preferred for the steam atmosphere to be saturated, but this is not necessary. Generally the steam atmosphere will contain from 10 to 100 wt. % of steam, preferably between 50 and 100 wt. %. It is possible to dry the washed zeolite before it is subjected to the steam calcination step, but this is not necessary. In step (d), the steam-calcined zeolite obtained in step (c) is treated with phosphorus to incorporate 0.1 to 4 wt. % of phosphorus, calculated as $P_2O_5$, into the zeolite. The phosphorus-treatment may, e.g., be carried out by contacting the steam-calcined zeolite with an aqueous solution of a phosphorus-containing compound, such as phosphoric acid or monoammoniumdihydrogen phosphate, at a temperature between 10° and 80° C. After the treatment with phosphorus it may be desirable to carry out an extra ammonium-exchange step, analogous to the one described in step (a). Whether or not such an extra step is desired will depend on the $Na_2O$ content of the zeolite, and on whether or not the FCC catalyst into which the modified zeolite will be incorporated will be subjected to a washing step to remove excess ions.

Although applicant does not wish to be bound by theory, it is assumed that both the aluminum-exchange and the steam calcination lead to a higher amount of extra-lattice aluminum being present in the zeolite, forming condensed species. The phosphorus-treatment of the zeolite results in the formation of aluminum-phosphorus compounds, which seem to confer specific catalytic properties to the zeolite. The amount of phosphorus to be incorporated into the zeolite can be related to the amount of Al° present in the zeolite. Al° is the amount of aluminum, calculated as $Al_2O_3$, determined as described by G.T. Kerr in the Journal of Physical Chemistry, vol. 71, p 4155 (1967), which is incorporated herein by reference in its entirety, and a measure for the amount of cationic aluminum species present in the zeolite. It is preferred that the atom ratio between Al° and P is in the range of 0.8 to 2.0, most preferably between 0.5 and 1.5.

The present invention also relates to the phosphorus-containing Y-zeolite obtainable by the present process, which zeolite includes from 0.5 to 6 wt. % of exchanged aluminum, calculated as $Al_2O_3$, and from 0.1 to 4 wt. % of phosphorus, calculated as $P_2O_5$. Preferably, the zeolite includes from 0.5 to 2.0 wt. % of exchanged aluminum, calculated as $Al_2O_3$, and from 0.8 to 2 wt. % of phosphorus, calculated as $P_2O_5$. It is preferred that the zeolite has a micropore volume between 0.25 and 0.35 ml/g and a mesopore surface area between 5 and 40 $m^2/g$, and that the zeolite after it has been deactivated for 5 hours at 788° C. in a 100% steam atmosphere according to the procedure described in Example 1 has a micropore volume between 0.1 and 0.2 ml/g, a mesopore surface area of from 35 to 60 $m^2/g$, and a Na content of 0.1 to 1 wt. %, calculated as $Na_2O$. It is further preferred that the zeolite has a unit cell size between 2.420 and 2.430 nm determined according to ASTM D-3942 after deactivation at 788° C. for 5 hours in a steam atmosphere, according to the procedure described in Example 1.

The aluminum-exchanged phosphorus containing Y-zeolite according to the present invention is very suitable for use in hydrocarbon conversion catalysts, particularly FCC catalysts. The FCC catalyst will generally include from 1 to 60 wt. % of the zeolite according to the present invention, optionally in combination with other zeolites. The total amount of zeolite in the FCC catalyst will generally range between 10 and 60 wt. %, more in particular between 15 and 35 wt. %.

Examples of other zeolites which may be used in FCC catalysts in combination with the aluminum-exchanged Y-zeolite according to the present invention are synthetic faujasites, such as X and Y zeolites, as well as ZSM-5, ZSM-11, ZSM-12, ZSM-22, MCM-41, zeolite beta, hexagonal faujasites, and hydrothermally or chemically modified zeolites. If another zeolite is used in combination with the zeolite according to the present invention, it is preferred to employ zeolite Y or hydrothermally or chemically modified variants thereof, such as ultrastable zeolites, which are described, int. al., in U.S. Pat. Nos. 3,293,192 and 3,506,400 and NL 7,604,264, as well as in C. V. Mc.Daniel and P. K. Maher, *Society of Chemical Engineering (London), Monograph Molecular Sieves* (1968), p. 186, each of which is incorporated herein by reference in its entirety. Preference is given to a zeolite containing a low amount of alkali metal ions, more particularly a low amount of sodium ions. The sodium ions which generally are present in freshly synthesized zeolites may be replaced through ion exchange with, for example, hydrogen ions or a precursor thereof such as ammonium ions. As a rule, the ion exchange, effected on the zeolite or on the catalyst, will be performed until the zeolite, as present in the final catalyst, contains less than 4 wt. %, preferably less than 1.0 wt. %, of sodium, calculated as oxide.

FCC catalysts containing the zeolite according to the invention will further contain a matrix such as silica, silica alumina, alumina, titania, magnesia, zirconia, boria, and mixtures thereof. Preference is given to silica, silica-alumina, and alumina. It is possible to incorporate other constituents into the matrix, for instance non-ionic clays such as kaolin, bentonite clays such as that described in U.S. Pat. Nos. 3,252,757; 3,252,889 and 3,743,594, each of which is incorporated herein by reference in its entirety, montmorillonite, and the like. If desired, it is possible to incorporate a rare earth metal component into the zeolite or the catalyst composition using procedures which are well known in the field of FCC catalysts.

Optionally, the catalyst composition may contain oxidation promoters. These serve, int. al., to catalyze the reaction of CO into $CO_2$ during catalyst regeneration. Noble metals or compounds thereof from Group VIII of the Periodic Table, such as Pt, Pd, Ir, Rh, Os, and Ru, are especially suited, while Cr and Cu and compounds thereof are suitable also. If an oxidation promoter is employed, preference is given to from 0.1 to 100 ppm, more particularly from 0.1 to 50 ppm, of a noble metal from Group VIII being used. Most preferred is the use in the catalyst composition of from 0.1 to 10 ppm of platinum or palladium. These metals may be provided on the finished FCC catalyst in a known manner, e.g., by impregnation with an appropriate salt solution, or they may be mixed with the finished catalyst composition in the form of separate particles made up, for example, of platinum on alumina.

When the FCC catalyst is to be used for cracking feeds which contain large amounts of metals it may be advantageous to incorporate a metal scavenger into the FCC catalyst. This can be done by impregnating the catalyst composition with metal scavengers, e.g., alkaline earth metal components, such as salts and (hydr)oxides of barium, calcium, and magnesium. Metal passivators such as antimony compounds, tin compounds, barium titanate, and anatase can also be included in the catalyst composition in a conventional manner.

The different constituents of the catalyst particles can be combined in a known manner. Suitable processes for preparing FCC catalysts are described, int. al., in U.S. Pat. Nos. 3,609,103 and 3,676,330, each of which is incorporated herein by reference in its entirety. Usually, the catalyst is prepared by simply mixing all the constituents to form a slurry, followed by spray-drying. The spray-dried particles are preferably washed before use in order to remove objectionable salts. The size of the catalyst particles may be varied within wide limits. In general, FCC catalysts will have a particle size in the range of from 20 to 150 μm, preferably in the range of from 40 to 90 μm.

Usually, the catalytic cracking of hydrocarbon feeds using an FCC catalyst is carried out at a temperature in the range of from 375° to 650° C., more particularly in the range of from 460° to 560° C. The pressure under which the reaction is carried out usually is in the range of atmospheric pressure to 7 atm., notably in the range of from 1 to 3 atm. The oxidative regeneration of the catalyst composition with oxygen-containing gas usually is carried out at a temperature in the range of from 540° to 825° C., more particularly in the range of from 700° to 750° C., and in the presence of steam.

The present invention will be further illustrated with reference to the following specific examples. It is understood that these examples are given by way of illustration and are not meant to limit the disclosure or the claims to follow.

First of all, various measuring techniques will be described.

The surface area characteristics are obtained from the nitrogen adsorption isotherm at 78 K, which can be determined using commercially available equipment, e.g., Micromeritics A.S.A.P.-2400 or Gemini-2360. The SPESA (single point equivalent surface area) is calculated from the adsorption $V_a$ at a relative pressure $P/P_0$ of 0.30, according to the equation:

$$\text{SPESA } (m^2/g) = 4,353(1-P/P_0)V_a(ml/g \text{ at standard } T \text{ and } P)$$

$V_a$ is interpolated from adjacent points on the adsorption isotherm.

To calculate the micro PV and the meso SA the nitrogen adsorption isotherm in the range of $P/P_0 = 0.08$ to 0.80 is converted to a t-plot using the Harkins-Jura equation given by de Boer et al. (J. Colloid Interface Sci.u Vol. 21 (1966), 405), with t standing for the thickness of the adsorbed layer.

$$t (Å) = \left( \frac{13.99}{0.034 - \log P/P_0} \right)^{1/2}$$

Since the t-plots of zeolites are slightly curved, the part of the plot used for determining the slope and the intercept has to be specified. In the present application the range employed is from t is 0.6 nm to t is 0.9 nm. The straight line drawn through the points in this range with the aid of the least squares method has an intercept $V_{mi}$ and a slope $\Delta V_a/\Delta t$. The micro PV and the meso SA are calculated using the following formulae:

$$\text{micro } PV \text{ (ml/g)} = 0.001547 \, V_{mi}$$

$$\text{meso } SA \text{ (m}^2/g) = 15.47 \, \Delta V_a/\Delta t$$

The chemical composition of the zeolites is determined by way of X-ray fluorescence. The sodium content is determined by atomic adsorption of the samples obtained after digestion of the zeolite with $HNO_3/HCl$. The surface chemical composition was determined by way of X-ray photoelectronic spectroscopy (XPS). The crystallinity was determined by way of X-ray diffraction, with the most crystalline sample being rated at 100% crystallinity. All other crystallinity values are related to this maximum.

The Si/Al atom ratio of the zeolite framework was determined from I.R. spectra. The mid-infrared region of 400–1200 $cm^{-1}$ contains the fundamental vibrations of the $SiO_4$ and $AlO_4$ units in all zeolite frameworks. This area therefore contains valuable structural information on the zeolite framework. The stretching frequencies of the O-T-O bond, with T being either Si or Al, increase as the number of Al atoms in the zeolite framework decreases. Sohn et al.

(*Zeolites* 6 (1986) 225–227) shows that the bands in the 800 ($v_1$) and 1050 $cm^{-1}$ ($v_2$) regions shift as the number of aluminum atoms in the unit cell varies. This variation can be used to calculate the Si/Al atom ratio of the zeolite framework from the I.R. spectrum, using the following formulae, in which $v_1$ is the wavenumber ($cm^{-1}$) of the band in the 800 $cm^{-1}$ region.

$$N_{Al} = 0.8375 (851.60 - v_1)$$

$$Si/Al_{frame} = \frac{192 - N_{Al}}{N_{Al}}$$

The powderform zeolite samples were prepared using the pellet technique by mixing and pressing under vacuum 0.7 mg of zeolite with 300 mg of potassium bromide, infrared grade, which had previously been dried at 100° C. under vacuum. A Nicolet FT-IR 60 SXR spectrometer was used, and the IR signal was averaged over 32 scans for each sample, with a resolution of 4 $cm^{-1}$.

EXAMPLE 1

In this example an aluminum-exchanged phosphorus-containing zeolite is prepared by the process according to the present invention. The starting material was an NaY-zeolite with the properties displayed in Table 1.

TABLE 1

| | |
|---|---|
| Na$_2$O (wt. %) | 12.2 |
| SPESA (m$^2$/g) | 720 |
| crystallinity (%) | 100 |

(a) 12 kg (calculated as dry weight) of the zeolite were slurried with 6.7 kg of (NH$_4$)$_2$SO$_4$ and 6.13 kg of water. The pH of the slurry was adjusted to 4.5 by adding concentrated HCl. The acidified slurry was heated to a temperature of 80° C., and maintained at that temperature for 30 minutes under stirring, after which the zeolite was isolated from the mixture by filtration. This process was repeated twice. After the last filtration step, the filtercake was washed with water at 70° C. to remove excess ammonium sulphate.

(b) 3 kg (calculated as dry weight) of the ammonium-exchanged zeolite prepared in step (a) were slurried in 16.3 kg water together with 195 grams of a 7.9 wt. % of Al$_2$(SO$_4$)$_3$ solution. The pH of the resulting slurry was adjusted to a value of 3.5 using a 1 N NaOH solution. The slurry was heated to a temperature of 60° C., and maintained at that temperature for 1 hour under vigorous stirring. The aluminum-exchanged zeolite was isolated by filtration, and the filtercake was washed with water at 70° C. to remove excess aluminum sulphate. This resulted in an aluminum-exchanged zeolite containing 0.5% of exchanged aluminum, calculated as Al$_2$O$_3$. In order to prepare a zeolite containing 1% of exchanged aluminum, 3 kg of the ammonium-exchanged zeolite prepared in step (a) was slurried in an analogous manner with 390 grams of 7.9 wt. % aluminum sulphate solution. To prepare a zeolite comprising 2% of exchanged aluminum, 780 grams of 7.9 wt. % aluminum sulphate solution were used. Table 2 gives the properties of aluminum-exchanged zeolites obtained in step (b) containing different amounts of aluminum. The zeolite comprising 0% of Al$_2$O$_3$ is the zeolite obtained in step (a). In this and the following Tables, Al ex stands for the amount of aluminum, calculated as Al$_2$O$_3$, which has been exchanged into the zeolite. P stands for the amount of phosphorus, calculated as P$_2$O$_5$, incorporated into the zeolite. Si/Al$_{frame}$ and Si/Al$_{surf}$ stand for the Si/Al atom ratio in the zeolite framework and on the zeolite surface, respectively. The other abbreviations are self-explanatory.

TABLE 2

| Al ex (%) | PVmicro ml/g | SAmeso (m$^2$/g) | SPESA (m$^2$/g) | Crystallinity (%) |
|---|---|---|---|---|
| 0 | 0.35 | 17.0 | 696 | 100 |
| 0.5 | 0.35 | 15.0 | 695 | 94 |
| 1.0 | 0.33 | 15.0 | 667 | 91 |
| 2.0 | 0.33 | 15.0 | 650 | 86 |

(c) The aluminum-exchanged zeolites obtained in step (b) were dried for 16 hours at 120° C. The dried samples were steam-calcined at different temperatures by contacting them for 1 hour in an open rotary oven with steam. The steam calcination was carried out at 550, 600, and 650° C. Table 3 gives the properties of aluminum-exchanged zeolites having different aluminum contents which were calcined at different temperatures.

TABLE 3

| Al ex (%) | Ctemp °C. | PVmicro ml/g | SAmeso (m$^2$/g) | SPESA (m$^2$/g) | Si/Al frame | Si/Al surf. | Al° |
|---|---|---|---|---|---|---|---|
| 0 | 550 | 0.35 | 27 | 665 | 4.3 | | 1.6 |
| 0 | 600 | 0.33 | 39 | 630 | 5.0 | 1.5 | |
| 0 | 650 | 0.30 | 47 | 653 | 5.4 | 1.0 | 2.7 |
| 0.5 | 550 | 0.30 | 27 | 614 | 3.8 | | 1.4 |
| 0.5 | 600 | 0.30 | 41 | 624 | 4.5 | 2.1 | 2.2 |
| 0.5 | 650 | 0.26 | 40 | 555 | 5.0 | | 2.5 |
| 1.0 | 550 | 0.30 | 32 | 607 | 3.9 | 2.7 | 1.7 |
| 1.0 | 600 | 0.29 | 39 | 607 | 4.5 | 2.0 | 2.2 |
| 1.0 | 650 | 0.29 | 41 | 614 | 5.0 | 1.4 | 2.5 |
| 2.0 | 550 | 0.28 | 30 | 584 | 3.9 | | 1.9 |
| 2.0 | 600 | 0.29 | 35 | 593 | 4.4 | 1.9 | 2.2 |
| 2.0 | 650 | 0.27 | 37 | 570 | 5.0 | | 2.7 |

Al° is the amount of alumina as determined by the Kerr method, which is a measure for the cationic aluminum species present in the zeolite. From a comparison between the Si/Al atom ratio in the framework and the Al° it can be concluded that (i) steam calcination promotes the hydrolysis of framework aluminum atoms, since zeolites which have not been subjected to an aluminum exchange yet contain cationic aluminum after steam calcination; (ii) steam calcination promotes the condensation of cationic aluminum species; as a matter of fact, zeolites calcined at equal temperatures with an equal Si/Al atom ratio in the framework have approximately the same Al° concentration after calcination regardless of the fact that the amount of aluminum exchanged into the parent zeolites was different. This indicates that the cationic aluminum undergoes condensation upon calcination, with the condensed aluminum species not being in a form in which it will be determined by the Kerr method.

It appears from Table 3 that the mesopore surface decreases when the amount of exchanged alumina present in the zeolite increases. Further, the amount of mesopore surface decreases when the amount of Al° increases. Although applicants do not wish to be bound by any theory it appears that both of these effects can be explained by the assumption that extra-framework alumina, whether it is derived from aluminum exchanged into the zeolite or from alumina loosened from the framework by the calcination step, blocks the mesopores.

(d) Phosphorus was incorporated into the steamed zeolites obtained in step (c) by way of the following procedure: 1 kilogram (based on dry weight) of each of the steam-calcined zeolites obtained in step (c) were reslurried in 3 kilograms of water at 25° C. To each slurry different amounts of a 30 wt. % aqueous solution of $H_3PO_4$ have been dosed. The $H_3PO_4$-treated zeolites were subsequently washed with water and dried at 120° C. The amount of phosphorus incorporated into each zeolite, calculated as $P_2O_5$, is given in Table 4.

(e) The phosphorus-containing zeolites obtained in step (d) were reslurried in water, after which the slurry was ground in a colloid mill. Then, the zeolite was subjected to an ammonium-exchange as described in step (a) to further reduce the amount of $Na_2O$ present in the zeolite. A sample of each resulting ammonium-exchanged zeolite is deactivated according to the following procedure. Approximately 60 grams of zeolite sample were loaded into an 18 mm ID SANICRO 31H alloy tube. The zeolite was steamed at 788° C. for 5 hours in a 100% steam atmosphere. The water flow was about 10 ml/hour. Some properties of the phosphorus-containing zeolites prepared in this step are given in Table 4. It is noted that for each of these zeolites, the steam calcination step was carried out at 600° C.

phosphorus-containing zeolites the extra-lattice alumina reacts with the phosphorus under the formation of aluminiumphosphate, which give specific catalytic properties to the zeolite.

EXAMPLE 2

This example shows the improved results obtained in the catalytic cracking of hydrocarbon feeds using the aluminum-exchanged phosphorus-containing zeolite according to the present invention. Zeolites A to D, of which some properties are given in Table 5, were prepared by way of a process analogous to the process described in Example 1 starting from the zeolite used as starting material in Example 1. More particularly, Zeolite A was prepared by carrying out steps (a), (c), and (e) of Example 1. Zeolite B was prepared by carrying out steps (a), (c), (d), and (e) of Example 1. Zeolite C was prepared by carrying out steps (a), (b), (c), and (e) of Example 1. Zeolite D was prepared by carrying out steps (a), (b), (c), (d), and (e) of Example 1. The steam calcination was carried out for a period of 1 hour at a temperature of 600° C.

TABLE 5

|  | Al ex (%) | P (wt. %) |
|---|---|---|
| Zeolite A | 0 | 0 |
| Zeolite B | 0 | 1.3 |
| Zeolite C | 2 | 0 |
| Zeolite D | 2 | 1.4 |

The zeolites were deactivated by contacting them with steam for 5 hours at 788° C. according to the procedure described in Example 1. Catalyst disks were prepared from each of the zeolites A through D by pressing the powders in a known manner. The resulting disks were milled and sieved to select the fraction with a particle size between 0.59 and 0.84 mm. The evaluation was effected in a completely automatic MAT (microactivity test) unit. The MAT-test is described by A. Corma et al. in Applied Catalysis, vol. 66, p. 248 (1990). Before each run, the catalyst particles were

TABLE 4

| | | | Fresh zeolite | | | Deactivated zeolite | | |
|---|---|---|---|---|---|---|---|---|
| Al ex (%) | P wt. % | Na₂O wt. % | PVmicro ml/g | SAmeso m²/g | SPESA m²/g | PVmicro ml/g | SAmeso m²/g | SPESA m²/g |
| 0 | 0 | 0.49 | 0.3 | 34 | 641 | 0.19 | 35 | 400 |
| 0 | 1.3 | 0.37 | 0.31 | 13 | 615 | 0.18 | 41 | 391 |
| 0.5 | 0 | 0.45 | 0.30 | 37 | 632 | 0.17 | 38 | 377 |
| 0.5 | 1.2 | 0.38 | 0.30 | 16 | 598 | 0.17 | 47 | 382 |
| 0.5 | 1.4 | 0.41 | 0.32 | 15 | 631 | 0.17 | 49 | 383 |
| 1.0 | 0 | 0.43 | 0.29 | 35 | 606 | 0.17 | 36 | 375 |
| 1.0 | 1.2 | 0.38 | 0.31 | 16 | 612 | 0.18 | 51 | 395 |
| 1.0 | 1.6 | 0.36 | 0.28 | 12 | 565 | 0.18 | 53 | 397 |
| 2.0 | 0 | 0.56 | 0.28 | 30 | 577 | 0.16 | 36 | 337 |
| 2.0 | 1.4 | 0.44 | 0.27 | 16 | 541 | 0.17 | 55 | 376 |
| 2.0 | 1.9 | 0.40 | 0.26 | 13 | 520 | 0.15 | 52 | 344 |

It appears from Table 4 that the presence of phosphorus in the zeolite lowers the mesopore surface area of the fresh zeolite. However, when the zeolite is deactivated, the mesopore surface area increases with increasing phosphorus concentration. This effect becomes more pronounced when the amount of aluminum exchanged into the zeolite is increased. Without wishing to be bound by theory it is assumed that upon deactivation of the aluminum-exchanged contacted with a nitrogen flow (30 ml/min) for 20 minutes at a temperature of 482° C. A gas oil feed was fed to the upper part of the reactor with a syringe pump of continuous displacement for a contact period of 75 seconds. After each run the system was purged with nitrogen and the reaction products were collected. Between the runs, the catalyst was regenerated by contacting it with air (30 ml/min) for 3.5 hours at a temperature of 520° C. The liquid products were analyzed by simulated distillation. The gaseous products were analyzed by liquid chromatography. The coke formed on the catalyst was determined by measuring the amounts of carbon dioxide and water collected during the regeneration of the catalyst. The conversion was defined as the total of product gases, gasoline, LCO and coke. The catalyst-to-oil ratio was varied between 0.7 and 2.0, with the amount of zeolite catalyst being maintained at 3.0 grams and the amount of gas oil feed being varied.

The gas oil feed had the distillation curve, as determined according to ASTM D-1160

| Percentage (wt. %) | Boiling point (°C.) |
|---|---|
| IBP | 202 |
| 5 | 373 |
| 10 | 409 |
| 20 | 410 |
| 30 | 416 |
| 40 | 420 |
| 50 | 424 |
| 60 | 429 |
| 70 | 440 |
| 80 | 452 |
| 90 | 466 |
| FBP | 479 |

The results of the experiments are given in Table 6.

TABLE 6

| Zeolite | A | B | C | D |
|---|---|---|---|---|
| Amount of Al ex (%) | 0 | 0 | 2 | 2 |
| Amount of P (wt. %) | 0 | 1.3 | 0 | 1.4 |
| CTO = 2 wt./wt. Conversion (wt. %) | 67.5 | 72.7 | 65.9 | 78.5 |
| Conv. = 65 wt. % | | | | |
| CTO (wt./wt.) | 1.8 | 1.3 | 1.9 | 1.1 |
| Coke (wt. %) | 5.3 | 3.3 | 4.0 | 2.8 |
| C1 + C2 (wt. %) | 0.8 | 0.8 | 0.8 | 0.8 |
| C3 + C4 (wt. %) | 6.7 | 6.1 | 7.0 | 6.6 |
| Gasoline (wt. %) | 37.9 | 39.6 | 38.7 | 39.3 |
| LCO (wt. %) | 14.3 | 15.2 | 14.6 | 15.5 |
| C4=/C4 | 1.26 | 1.14 | 1.45 | 1.09 |
| C3=/C3 | 4.5 | 4.3 | 4.2 | 4.6 |
| isoC4 (wt. %) | 0.83 | 0.72 | 0.85 | 0.58 |

A comparison between Zeolites A and B indicates that the addition of phosphorus to the catalyst composition results in an improved conversion. Further, the coke sensitivity is decreased by the addition of phosphorus, while the gasoline selectivity and the LCO selectivity are increased. A comparison between Zeolites A and C indicates that the aluminum exchange step makes the resulting zeolite less sensitive to coke formation. A comparison of Zeolite D which is an aluminum-exchanged phosphorus-containing zeolite according to the invention with Zeolites B and C, which were either exchanged with aluminum or contained phosphorus, indicates that the combination of an aluminum-exchange and phosphorus results in a zeolite which shows an even more improved conversion, an even more decreased coke sensitivity, and an improved =$C_3/C_3$ ratio. The latter effect is especially surprising, since both aluminum-exchange and the addition of phosphorus lower the =$C_3/C_3$ ratio, as can be seen from a comparison between the results of Zeolites A and B, and A and C, respectively.

While the invention has been described with preferred embodiments, it is to be understood that variations and modifications are to be considered within the preview and the scope of the claims appended hereto.

What is claimed is:

1. A process for preparing a phosphorus-containing Y-zeolite which comprises:

a) exchanging a NaY zeolite with a solution of an ammonium salt in a manner so as to lower the amount of $Na_2O$ in the zeolite to a value below 7 wt. %;

b) contacting the product obtained in step a) with an aqueous acidic aluminum-containing solution with a pH between 2 and 4, until the zeolite contains from 0.5 to 6 wt. % of exchanged aluminum, calculated as $Al_2O_3$;

c) isolating and washing the product of step b), and calcining the resulting product in a steam atmosphere at a temperature of from 450° to 800° C. for a period of from 15 minutes to 4 hours; and d) treating the calcined zeolite obtained in step c) with a phosphorus-containing compound, to incorporate from 0.1 to 4 wt. % of phosphorus, calculated as $P_2O_5$, into the zeolite.

2. The phosphorus-containing Y-zeolite prepared by the process of claim 1, which comprises from 0.5 to 6 wt. % of exchanged aluminum, calculated as $Al_2O_3$, and from 0.1 to 4 wt. % of phosphorus, calculated as $P_2O_5$.

3. The phosphorus-containing Y-zeolite according to claim 2, which comprises from 0.5 to 2 wt. % of exchanged aluminum, calculated as $Al_2O_3$, and from 0.8 to 2 wt. % of phosphorus, calculated as $P_2O_5$.

4. The phosphorus-containing Y-zeolite according to claim 2, wherein the zeolite has a micropore volume between 0.25 and 0.35 ml/g and a mesopore surface area between 5 and 40 m²/g, and the zeolite, as measured following deactivation for 5 hours at 788° C. in a 100% steam atmosphere, has a micropore volume between 0.1 and 0.2 ml/g, a mesopore surface area of from 35 to 60 m²/g, and a Na content of from 0.1 to 1 wt. %, calculated as $Na_2O$.

5. The phosphorus-containing Y-zeolite according to claim 2, which has a unit cell size between 2.420 and 2.430 nm, as measured following deactivation at 788° C. for 5 hours in a 100% steam atmosphere.

6. FCC catalyst comprising a zeolite prepared in accordance with the process of claim 1 and a matrix.

* * * * *